United States Patent
Zhang et al.

(10) Patent No.: US 11,462,058 B2
(45) Date of Patent: Oct. 4, 2022

(54) UNDERCARRIAGE WEAR PREDICTION BASED ON MACHINE VIBRATION DATA

(71) Applicant: Caterpillar Inc., Peoria, IL (US)

(72) Inventors: Li Zhang, Dunlap, IL (US); Yingbiao Xu, Dunlap, IL (US)

(73) Assignee: Caterpillar Inc., Peoria, IL (US)

(*) Notice: Subject to any disclaimer, the term of this patent is extended or adjusted under 35 U.S.C. 154(b) by 156 days.

(21) Appl. No.: 16/949,450

(22) Filed: Oct. 29, 2020

(65) Prior Publication Data
US 2022/0139118 A1    May 5, 2022

(51) Int. Cl.
G07C 5/00 (2006.01)
G06F 17/14 (2006.01)
G07C 5/08 (2006.01)

(52) U.S. Cl.
CPC ........... *G07C 5/006* (2013.01); *G06F 17/142* (2013.01); *G07C 5/0808* (2013.01); *G07C 5/0816* (2013.01)

(58) Field of Classification Search
CPC .... G07C 5/006; G07C 5/0808; G07C 5/0816; G06F 17/142
USPC ...................................................... 701/29.4
See application file for complete search history.

(56) References Cited

U.S. PATENT DOCUMENTS

| | | | |
|---|---|---|---|
| 6,053,047 | A | 4/2000 | Dister et al. |
| 10,696,337 | B2 | 6/2020 | Hawkins et al. |
| 2002/0083773 | A1 | 7/2002 | Ben-Romdhane |
| 2011/0290024 | A1* | 12/2011 | Lefler .................. G01H 1/003 73/579 |
| 2015/0081166 | A1 | 3/2015 | Diekevers et al. |
| 2017/0108406 | A1 | 4/2017 | Thomson |
| 2021/0335062 | A1* | 10/2021 | Claessens ............. G07C 5/008 |

FOREIGN PATENT DOCUMENTS

| | | |
|---|---|---|
| JP | 4298433 B2 | 7/2009 |
| JP | 5384227 B2 | 1/2014 |
| WO | 2016126575 A1 | 8/2016 |
| WO | 2019109191 A1 | 6/2019 |
| WO | 202049526 A2 | 3/2020 |

* cited by examiner

*Primary Examiner* — Allen C Wong (74) *Attorney, Agent, or Firm* — Harrity & Harrity LLP (57) ABSTRACT

A system may include a device. The device may be configured to receive machine vibration data identifying a measure of vibration of a machine. The vibration, of the machine, may be caused by a combination of first vibration caused by a motion of components of an undercarriage of the machine and second vibration that is unrelated to the first vibration. The device may be configured to identify a segment, of the machine vibration data, corresponding to the first vibration; transform the segment, using a Fast Fourier Transform (FFT), into a signal in a frequency domain; and analyze the signal to identify a signature spectrum associated with the motion of components. The device may be configured to predict, based on the signature spectrum, an amount of wear of the components. The device may be configured to cause an action to be performed based on the amount of wear of the components.

20 Claims, 3 Drawing Sheets

UNDERCARRIAGE WEAR PREDICTION BASED ON MACHINE VIBRATION DATA

TECHNICAL FIELD

The present disclosure relates generally to monitoring wear of an undercarriage of a machine and, for example, to predicting wear of the undercarriage based on machine vibration data.

BACKGROUND

Components (e.g., track links, bushings, and/or pins) of an undercarriage of a machine wear over a period of time. One technique for detecting wear of the components includes obtaining manual measurements of component dimensions of such components. The manual measurements may be compared against specified dimensions of the components. In order to obtain the manual measurements, the machine is required to suspend performing a task at a work site. Because obtaining manual measurements requires the machine to suspend performing the task and is a time consuming process (e.g., due to the travel time for obtaining manual measurements and/or the amount of time for obtaining manual measurements), obtaining manual measurements may negatively affect productivity at the work site. In this regard, the task (that is to be performed by the machine) may be suspended for a long period of time (e.g., a period of time during which the manual measurements are obtained).

Additionally, such manual measurements can be inaccurate. Inaccurate measurements of component dimensions, in turn, may result in incorrect predictions regarding an amount wear of the components. As a result of such incorrect predictions, the components may either fail prematurely or may be repaired or replaced prematurely (e.g., because the components may not be sufficiently worn to require replacement or repair). Such premature failure of the components or premature replacement or repair of the components may also negatively affect productivity at the work site.

International Patent Publication No. WO2020049526 (the '562 publication) discloses that a track system includes an attachment assembly including at least one of a first pivot defining a roll pivot axis, a second pivot defining a pitch pivot axis, and a third pivot defining a yaw pivot axis of the track system. The '562 publication also discloses that the track system further includes at least one actuator for pivoting the frame assembly about at least one of the roll and yaw pivot axes, and at least one monitoring sensor for determining, at least indirectly, at least one of a state of the track system and a ground surface condition. The '562 publication discloses that the at least one monitoring sensor is communicating with a track system controller to control the operation of the at least one actuator based on the at least one of the state of the track system and the ground surface condition.

While the '562 publication discloses that the at least one monitoring sensor is communicating with a track system controller, the '562 publication does not disclose that the track system controller receives vibration data from the at least one monitoring sensor and that the track system controller accounts for factors that affect vibration of a machine with respect to determining an amount of wear of the track system.

The device of the present disclosure solves one or more of the problems set forth above and/or other problems in the art.

SUMMARY

A method performed by a device includes receiving machine vibration data identifying a measure of vibration, of a machine, over a period of time; segmenting the machine vibration data to obtain time domain signals that include a time domain signal related to vibration associated with an undercarriage of the machine; transforming the time domain signal, using a Fast Fourier Transform (FFT), into a spectral domain signal; identifying, from the spectral domain signal, a signature spectrum associated with a motion of components of the undercarriage of the machine; predicting, based on an amplitude of the signature spectrum, an amount of wear of the components; and causing an action to be performed based on the amount of wear of the components.

A system includes a device configured to: receive machine vibration data identifying a measure of vibration of a machine, wherein the vibration, of the machine, is caused by a combination of first vibration caused by a motion of components of an undercarriage of the machine and second vibration that is unrelated to the first vibration; identify a segment, of the machine vibration data, corresponding to the first vibration; transform the segment, using a Fast Fourier Transform (FFT), into a signal in a frequency domain; analyze the signal to identify a signature spectrum associated with the motion of components; predict, based on the signature spectrum, an amount of wear of the components; and cause an action to be performed based on the amount of wear of the components.

A device includes one or more memories; and one or more processors configured to: receive machine vibration data identifying a measure of vibration of a machine, wherein the vibration, of the machine, is caused by a combination of first vibration caused by a motion of components of an undercarriage of the machine and second vibration that is unrelated to the first vibration; identify a segment, of the machine vibration data, corresponding to the first vibration; transform the segment, using a Fast Fourier Transform (FFT), into a signal in a frequency domain; analyze the signal to identify a signature spectrum associated with the motion of components; predict, based on the signature spectrum, an amount of wear of the components; and cause an action to be performed based on the amount of wear of the components.

DETAILED DESCRIPTION

This disclosure relates to a device that predicts an amount of wear of one or more components of an undercarriage of a machine, based on machine vibration data of the machine. The term "machine" may refer to any machine that performs an operation associated with an industry such as, for example, mining, construction, farming, transportation, or another industry. Moreover, one or more implements may be connected to the machine.

Figure 1:
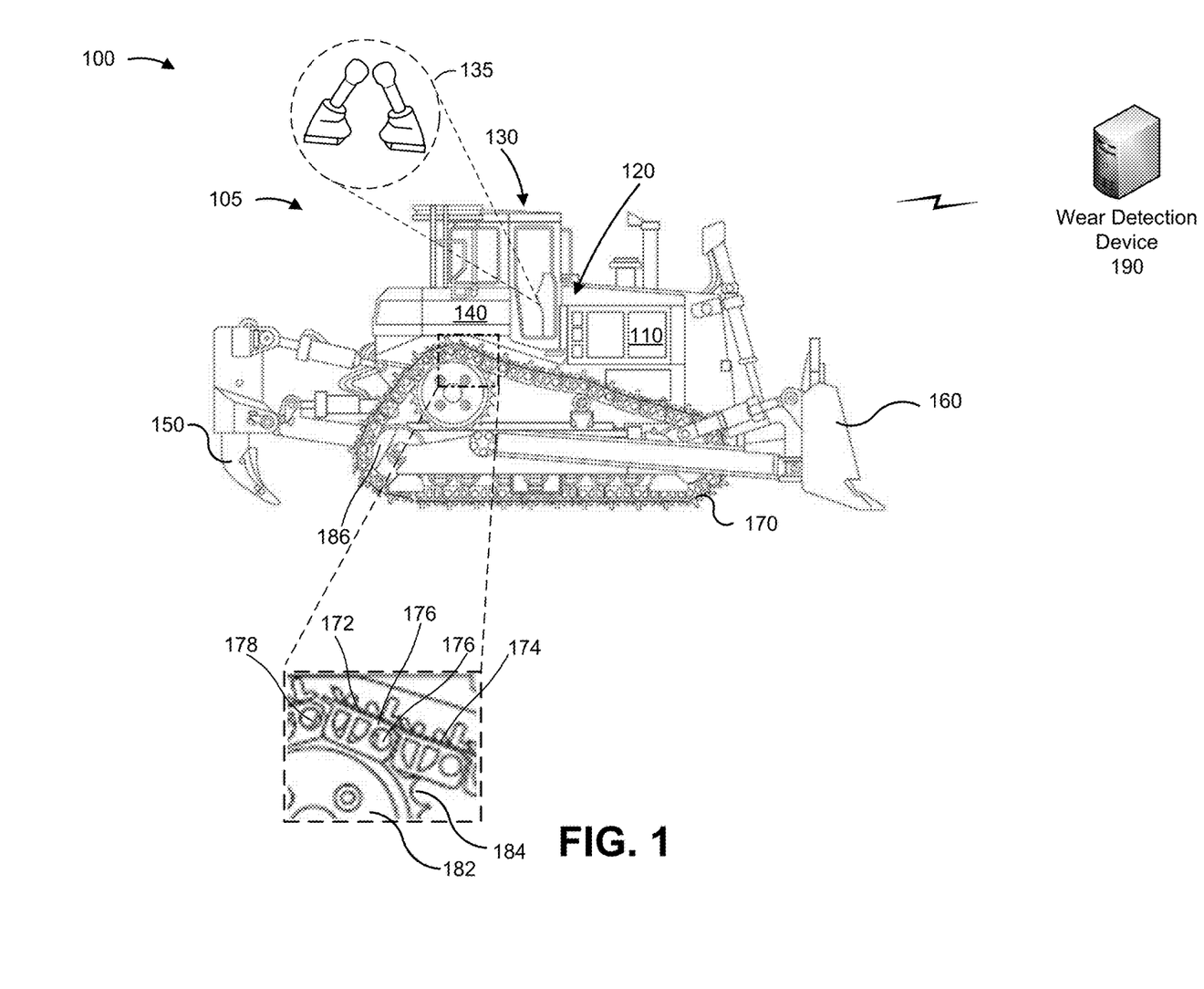
FIG. 1 is a diagram of an example implementation described herein.

FIG. 1 is a diagram of an example implementation 100 described herein. As shown in FIG. 1, the example implementations 100 includes a machine 105 and a wear detection device 190. Machine 105 is embodied as an earth moving machine, such as a dozer. Alternatively, the machine 105 may be another type of track-type machine such as an excavator.

As shown in FIG. 1, machine 105 includes an engine 110, a sensor system 120, an operator cabin 130, operator controls 135, a controller 140, a rear attachment 150, a front attachment 160, and ground engaging members 170.

Engine 110 may include an internal combustion engine, such as a compression ignition engine, a spark ignition engine, a laser ignition engine, a plasma ignition engine, and/or the like. Engine 110 provides power to machine 105 and/or a set of loads (e.g., components that absorb power and/or use power to operate) associated with machine 105. For example, engine 110 may provide power to one or more control systems (e.g., controller 140), sensor system 120, operator cabin 130, and/or ground engaging members 170.

Engine 110 can provide power to an implement of machine 105, such as an implement used in mining, construction, farming, transportation, or any other industry. For example, engine 110 may power components (e.g., one or more hydraulic pumps, one or more actuators, and/or one or more electric motors) to facilitate control of rear attachment 150 and/or front attachment 160 of machine 105.

Sensor system 120 may include sensor devices that are capable of generating signals that may be used to predict an amount of wear of one or more components of an undercarriage of machine 105 (as described in more details below). The types of sensor devices, of sensor system 120, are described in more detail below in connection with FIG. 2.

Operator cabin 130 includes an integrated display (not shown) and operator controls 135. Operator controls may include one or more input components (e.g., integrated joysticks, push-buttons, control levers, and/or steering wheels) to control an operation of machine 105. For example, operator controls 135 may be used to control an operation of one or more implements of machine 105 (e.g., rear attachment 150 and/or front attachment 160) and/or control an operation of ground engaging members 170.

For an autonomous machine, operator controls may not be designed for use by an operator and, rather, may be designed to operate independently from an operator. In this case, for example, operator controls may include one or more input components that provide an input signal for use by another component without any operator input.

Controller 140 (e.g., an electronic control module (ECM)) may control and/or monitor operations of machine 105. For example, controller 140 may control and/or monitor the operations of machine 105 based on signals from operator controls 135, from sensor system 120, and/or from wear detection device 190. Controller 140 may predict an amount of wear of the one or more components of the undercarriage based on the signals from sensor system 120, from operator controls 135, and/or from wear detection device 190, as described in more detail below.

Rear attachment 150 may include a ripper assembly, a winch assembly, and/or a drawbar assembly. Front attachment 160 may include a blade assembly. Ground engaging members 170 may be configured to propel machine 105. Ground engaging members 170 may include wheels, tracks, rollers, and/or similar components, for propelling machine 105. Ground engaging members 170 may include an undercarriage that includes tracks (as shown in FIG. 1). The tracks may include track links. A track link may include a track link bushing and a track link pin. As an example, the tracks may include a first track link 172 and a second track link 174.

First track link 172 includes a first track link bushing 176 and a first track link pin 178. Second track link 174 includes a second track link pin 180.

Sprocket 182 may include one or more segments 184 (referred to herein individually as "segment 184," and collectively as "segments 184"). Sprocket 182 may be configured to engage with ground engaging members 170 and to drive ground engaging members 170. For example, segments 184 may be configured to engage track link bushings (e.g., of the tracks of ground engaging members 170) and rotate to cause the tracks to propel machine 105. In some examples, one or more idlers 186 may guide the tracks as the tracks rotate to propel machine 105.

Wear detection device 190 may include one or more devices capable of predicting an amount of wear of the one or more components of the undercarriage (e.g., one or more tracks, one or more track links such as first track link 172 and/or second track link 174, one or more track link bushings such first track link bushing 176, one or more track link pins such as first track link pin 178 and/or second track link pin 180, one or more sprockets 182, one or more segments 184, and/or one or more idlers 186). Based on the amount of wear, wear detection device 190 may predict a remaining life of the one or more components.

In some examples, wear detection device 190 may predict a wear rate of the one or more components and predict the amount of wear based on the wear rate. Wear detection device 190 may use a machine learning model to predict the wear rate and/or the amount of wear of the one or more components, as described in more detail below. Wear detection device 190 may be located within machine 105 (e.g., as part of controller 140), external to machine 105, or partially within and partially external to machine 105.

As indicated above, FIG. 1 is provided as an example. Other examples may differ from what was described in connection with FIG. 1.

Figure 2:
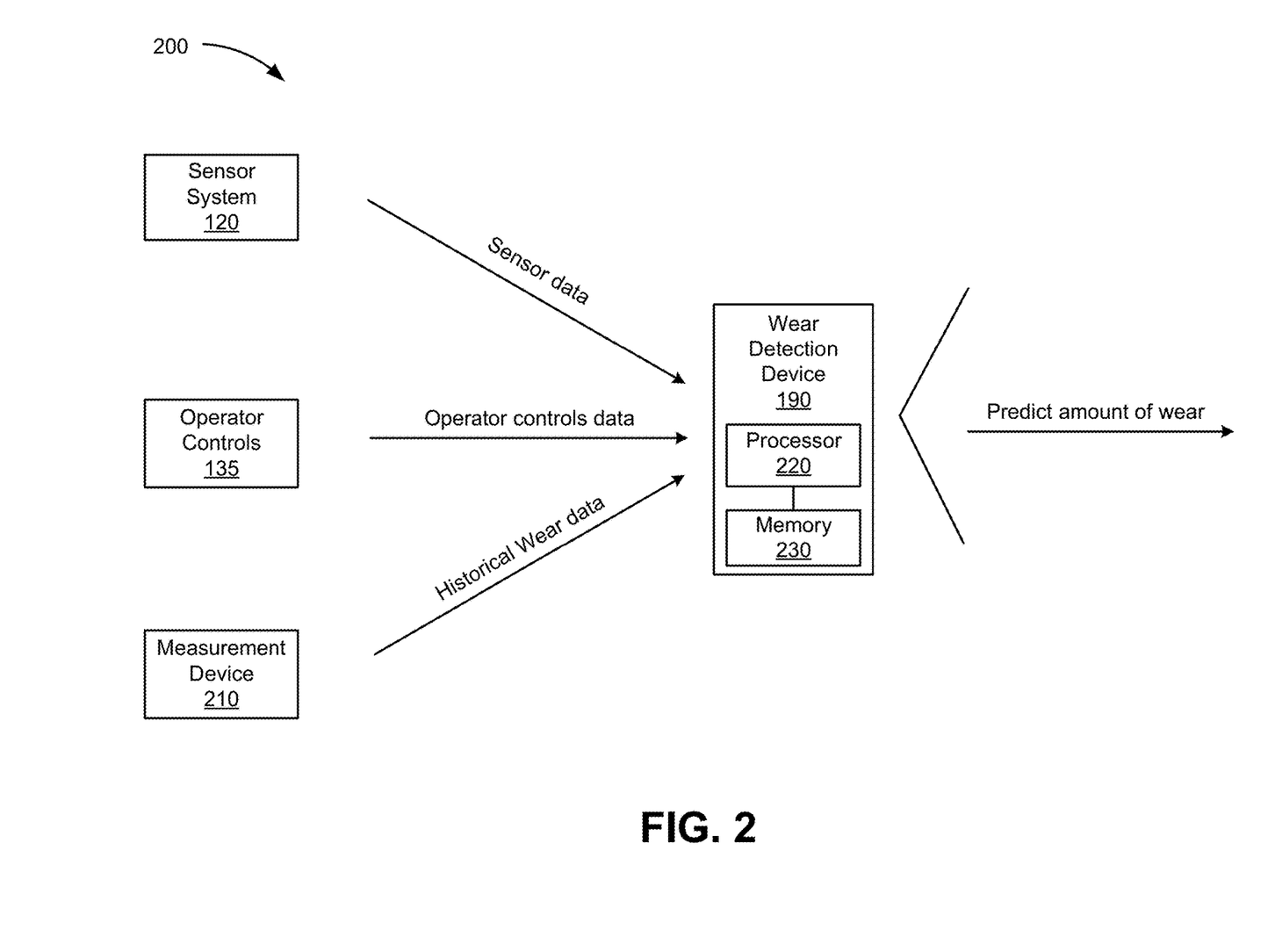
FIG. 2 is a diagram of an example described herein.

FIG. 2 is a diagram of an example system 200 described herein. As shown in FIG. 2, system 200 includes sensor system 120, operator controls 135, wear detection device 190, and a measurement device 210. Wear detection device 190 and/or measurement device 210 may be part of a site management system (e.g., of a work site associated with machine 105). Alternatively, wear detection device 190 and/or measurement device 210 may be part of a back office system or part of machine 105.

Wear detection device 190 and/or measurement device 210 may be included in a same device. Alternatively, wear detection device 190 and/or measurement device 210 may be separate devices.

Sensor system 120 may include sensor devices that generate sensor data associated with an amount of wear of the one or more components of the undercarriage. The one or more components may include one or more tracks, one or more track links such as first track link 172 and/or second track link 174, one or more track link bushings such first track link bushing 176, one or more track link pins such as first track link pin 178 and/or second track link pin 180, one or more sprockets 182, one or more segments 184, and/or one or more idlers 186. The sensor data may be used (e.g., by wear detection device 190) to predict an amount of wear of the one or more components. The sensor data may include information identifying times at which and/or dates on which the sensor data was generated.

Sensor system 120 may provide the sensor data to predict the amount of wear of the one or more components, as explained in more detail below. For instance, sensor system 120 may provide the sensor data to wear detection device 190 periodically (e.g., every hour, every other hour, and/or every work shift). Additionally, or alternatively, sensor system 120 may provide the sensor data to wear detection device 190 based on a triggering event (e.g., a request from wear detection device 190, a request from controller 140, and/or a request from an operator of machine 105 (e.g., via the integrated display and/or operator controls)).

The sensor devices may include a vibration sensor device, a motion sensor device, and/or another sensor device that provides sensor data that may be used to predict the amount of wear of the one or more components. The vibration sensor device may include one or more devices that sense a vibration of machine 105 and generate machine vibration data based on the vibration. As an example, the vibration sensor device may include one or more inertial measurement units (IMUs). The machine vibration data may indicate a measure of vibration of machine 105 over a period of time.

The motion sensor device may include one or more devices that sense the speed associated with machine 105 (e.g., engine speed of engine 110 and/or track speed of the undercarriage) and generate speed data identifying the speed associated with machine 105. In some implementations, the motion sensor device may further sense an acceleration of machine 105 and may generate acceleration data identifying the acceleration of machine 105. The motion sensor device may further sense a traveling direction of machine 105 and may generate direction data identifying the traveling direction of machine 105. The motion sensor device may include an accelerometer, a tachometer, a speedometer, and/or an IMU.

Operator controls 135 may include one or more devices that are capable of generating operator controls data that is used to control an operation of machine 105. For example, operator controls 135 may be used to control an operation of one or more implements of machine 105 (e.g., rear attachment 150 and/or front attachment 160) and/or control an operation of ground engaging members 170.

The operator controls data may include implement command data identifying a command for controlling the one or more implements, include steering command data identifying a steering command of machine 105, and/or include gear setting data identifying a gear setting of machine 105. Operator controls 135 may provide the operator controls data (e.g., to wear detection device 190) on a periodic basis and/or based on a triggering event.

In some examples, the operator controls data and/or the sensor data may form implement data. When predicting the amount of wear of the one or more components of the undercarriage, wear detection device 190 may use the implement data to determine whether the one or more implements are engaging the ground surface (and are, therefore, causing machine 105 to vibrate), as explained in more detail below.

Wear detection device 190 may include one or more devices (e.g., a server device or a group of server devices) configured to predict the amount of wear of the one or more components of the undercarriage, as explained in more detail below. Wear detection device 190 may include one or more processors 220 (referred to herein individually as "processor 220," and collectively as "processors 220"), and one or more memories 230 (referred to herein individually as "memory 230," and collectively as "memories 230").

A processor 220 is implemented in hardware, firmware, and/or a combination of hardware and software. Processor 220 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. A processor 220 may be capable of being programmed to perform a function.

Memory 230 includes a random-access memory (RAM), a read only memory (ROM), and/or another type of dynamic or static storage device (e.g., a flash memory, a magnetic memory, and/or an optical memory) that stores information and/or instructions for use by a processor 220 to perform a function. For example, when performing the function, wear detection device 190 may obtain the sensor data (e.g., from sensor system 120), the operator controls data (e.g., from operator controls 135), and/or the historical wear data (e.g., from measurement device 210) and may predict the amount of wear of the one or more components based on the sensor data, the operator controls data, and/or the historical wear data.

In some implementations, wear detection device 190 may be implemented by one or more computing resources of a cloud computing environment. For example, wear detection device 190 may be hosted in the cloud computing environment. Alternatively, wear detection device 190 may be non-cloud-based or may be partially cloud-based.

Measurement device 210 may include one or more devices that are capable of providing historical wear data regarding an amount of wear of historical components. The historical components may be similar to or same as the one or more components of the undercarriage (e.g., similar or same type of components, similar or same specification, and/or similar or same type of functions performed). The historical wear data may include vibration data of vibration caused by movement of the historical components and an amount of wear of the historical components corresponding to the vibration data. For example, the historical wear data may include first vibration data that is associated with a first amount of wear of the historical components, second vibration data that is associated with a second amount of wear of the historical components, and so on. As an example, the historical wear data may include a data structure that includes the information described above.

The historical wear data may include information obtained based on measurements (e.g., manual measurements associated with historical inspections) of the historical components. For example, the amount of wear of the historical components may be determined based on the measurements of the historical components. The historical wear data may be used by wear detection device 190 to predict the amount of wear of the one or more components of the undercarriage, as explained in more detail below. Measurement device 210 may provide the historical wear data (e.g., to wear detection device 190) on a periodic basis and/or based on a triggering event.

As shown in FIG. 2, wear detection device 190 may receive the sensor data from sensor system 120, the operator controls data from operator controls 135, and/or the historical wear data from measurement device 210. The sensor data may include the machine vibration data received from the vibration sensor device. The machine vibration data may indicate a measure of vibration of machine 105 over a period of time.

The vibration, of machine 105, may include a combination of first vibration caused by a motion of the one or more components (e.g., a cyclical movement of the one or more components causing a movement of machine 105) and second vibration that is unrelated to the first vibration. The second vibration may be caused by one or more implements of machine 105 (e.g., front attachment 150 and/or rear attachment 150) engaging a ground surface (e.g., a ground surface on which machine 105 is traveling). The second vibration may be caused by one or more other components of machine 105, such as engine 110.

Wear detection device 190 may analyze the machine vibration data to identify a first portion of the machine vibration data corresponding to the first vibration and identify a second portion of the machine vibration data corresponding to the second vibration. For example, wear detection device 190 may analyze the machine vibration data using the implement data that indicates whether the one or more implements of machine 105 are engaging the ground surface.

Wear detection device 190 may identify the first portion of the machine vibration data based on the implement data indicating that the one or more implements of machine 105 are not engaging the ground surface. Wear detection device 190 may identify the second portion of the machine vibration data based on the implement data indicating that the one or more implements of machine 105 are engaging the ground surface. Wear detection device 190 may remove the second portion of the machine vibration data from consideration.

The implement data may include the speed data, the acceleration data, and/or the direction data (e.g., included in the sensor data) generated over the period of time and/or may include the implement command data, the steering command data, and/or the gear setting data (e.g., included in the operator controls data) generated over the period of time. The implement data may include information identifying one or more first time portions (of the period of time associated with the machine vibration data) corresponding to the first vibration and information identifying one or more second time portions (of the period of time) corresponding to the second vibration.

For example, the one or more first time portions may correspond to when the one or more implements are not causing machine 105 to vibrate (e.g., because the one or more implements are not engaging the ground surface). The one or more second time portions may correspond to when the one or more implements are causing machine 105 to vibrate (e.g., because the one or more implements are engaging the ground surface).

Wear detection device 190 may determine whether the one or more implements are engaging the ground surface based on the machine speed data, the acceleration data, and/or the direction data. For example, wear detection device 190 may determine that the one or more implements are not engaging the ground surface (e.g., the first vibration) when the machine speed data indicates that the speed (associated with machine 105) is constant, when the acceleration data indicates that the acceleration of machine 105 is constant, and/or when the direction data indicates that machine 105 is traveling in a forward direction.

Alternatively, wear detection device 190 may determine that the one or more implements are engaging the ground surface (e.g., the second vibration) when the machine speed data indicates that the speed is variable (e.g., because machine 105 is performing a task associated with moving material using the one or more implements), when the machine speed data indicates that the speed satisfies a threshold speed (e.g., a speed associated with moving material using the one or more implements), when the acceleration data indicates that the acceleration of machine 105 is variable, and/or when the direction data indicates that machine 105 is traveling in a backward direction.

In some instances, wear detection device 190 may determine whether the one or more implements are engaging the ground surface based on the implement command data, the steering command data, and/or or the gear setting data. For example, wear detection device 190 may determine that the one or more implements are not engaging the ground surface when the implement command data indicates that an operator of machine 105 has not issued a command to use the one or more implements, when the steering command data indicates that the operator has not issued a steering command associated with using the one or more implements, and/or when the gear setting data indicates that machine 105 is in a gear unrelated to using the one or more implements.

Alternatively, wear detection device 190 may determine that the one or more implements are engaging the ground surface when the implement command data indicates that the operator has issued a command to use the one or more implements, when the steering command data indicates that the operator has issued a steering command associated with using the one or more implements, and/or when the gear setting data indicates that machine 105 is in a gear associated with using the one or more implements.

Wear detection device 190 may analyze the machine vibration data, in conjunction with the implement data, to isolate the first vibration from the second vibration based on the information identifying the one or more first time portions of the period of time (for the machine vibration data) corresponding to the first vibration and the information identifying one or more second time portions of the period of time corresponding to the second vibration (e.g., included in the implement data). In some instances, wear detection device 190 may identify segments of the machine vibration data as time domain signals based on the information identifying the one or more first time portions of the period of time and the information identifying one or more second time portions of the period of time.

As an example, wear detection device 190 may segment the machine vibration data into the time domain signals based on the information identifying the one or more first time portions of the period of time and the information identifying one or more second time portions of the period of time. The time domain signals may include a first time domain signal corresponding to the first portion (or first segment) of the machine vibration data and a second time domain signal corresponding to the second portion (or second segment) of the machine vibration data. Wear detection device 190 may identify and focus on the first portion (or first segment) of the machine vibration data corresponding to the first vibration and may identify and discard the second portion (or second segment) of the machine vibration data corresponding to the second vibration.

In some implementations, the first time domain signal may include a first time domain portion corresponding to the motion of the one or more components (e.g., the first vibration) and a second time domain portion of the time domain signal corresponding to random noise associated with terrain conditions at a location of machine 105. As an example, the random noise may be caused by machine 105 traveling on an uneven ground surface, by machine 105 traveling over a pothole, by machine 105 hitting a rock on the ground surface, and/or by another event affecting a movement of machine 105.

Wear detection device 190 may transform the first time domain signal into a spectral domain signal in order to amplify (or maximize) the first time domain portion of the first time domain signal and to reduce (or minimize) the second time domain portion of the first time domain signal. In some examples, wear detection device 190 may perform a transformation of the first time domain signal using a Fast Fourier Transform (FFT). Alternatively, wear detection device 190 may perform a transformation of the first time domain signal by determining (or calculating) a power spectral density (PSD) of the first time domain signal. The PSD may be determined using a FFT.

Wear detection device 190 may determine the PSD because a frequency resolution, associated with the PSD, exceeds a frequency resolution associated with a transformation using the FFT. For example, the PSD may enable a contrast between the first time domain portion and the second time domain portion that exceeds a contrast between the first time domain portion and the second time domain portion enabled by the FFT.

Wear detection device 190 may analyze the spectral domain signal to identify a signature spectrum associated with the motion of the one or more components. For example, wear detection device 190 may analyze the spectral domain signal to identify a spectral signature associated with the first time domain portion. Wear detection device 190 may identify the signature spectrum in a portion of the power spectral density corresponding to the first time domain portion.

Wear detection device 190 may predict an amount of wear of the one or more components based on an amplitude of the signature spectrum (e.g., an amplitude of a portion of the signature spectrum). As an example, wear detection device 190 may predict the amount of wear of the one or more components based on the amplitude of the signature spectrum and based on the historical wear data. As explained above, the historical wear data may include the first vibration data that is associated with the first amount of wear of the historical components, the second vibration data that is associated with the second amount of wear of the historical components, and so on.

The first vibration data may include information identifying a first signature spectrum associated with vibration caused by a movement of the historical components (e.g., when an amount of wear of the historical components is the first amount of wear) and information identifying an amplitude of the first signature spectrum. The second vibration data may include information identifying a second signature spectrum associated with vibration caused by a movement of the historical components (e.g., when the amount of wear of the historical components is the second amount of wear) and information identifying an amplitude of the second signature spectrum.

Wear detection device 190 may predict the amount of wear of the one or more components by analyzing the historical wear data to identify particular vibration data (e.g., a particular amplitude of a particular signature spectrum) that corresponds to the amplitude of the signature spectrum. By way of example, assume wear detection device 190 determines that the amplitude of the signature corresponds to the amplitude of the second signature spectrum. In such event, wear detection device 190 may predict that the amount of wear of the one or more components corresponds to the second amount of wear of the historical components.

In addition to, in the alternative to, predicting the amount of wear of the one or more components, wear detection device 190 may predict a wear rate of the one or more components and/or may predict a date and/or a time when the one or more components are to be replaced and/or repaired. The predicted wear rate of the one or more components, the predicted amount of wear of the one or more components, and/or the predicted date and/or time may be referred to hereinafter as "predicted component wear information."

In some implementations, wear detection device 190 may use a machine learning model to determine the predicted component wear information. For example, wear detection device 190 may input, into the machine learning model, the sensor data and/or the operator controls data and the machine learning model may output predicted component wear information. Wear detection device 190 may train the machine learning model using historical data associated with machine 105 and/or associated with one or more other machines similar to machine 105. The one or more machines may include similar components, similar dimensions, and/or similar usage as machine 105.

The similar components may include similar ground engaging members 170, similar tracks, similar track links such as first track link 172 and/or second track link 174, similar track link bushings such first track link bushing 176, similar track link pins such as first track link pin 178 and/or second track link pin 180, similar sprockets 182, similar segments 184, and/or similar idlers 186. The historical data may include historical sensor data, historical operator controls data, and/or historical wear data. The historical sensor data may include the sensor data received from sensor system 120, the historical operator controls data may include the operator controls data received from operator controls 135, and/or the historical wear data may include the historical wear data received from measurement device 210.

When training the machine learning model, wear detection device 190 may portion the training data into a training set (e.g., a set of data to train the machine learning model), a validation set (e.g., a set of data used to evaluate a fit of the machine learning model and/or to fine tune the machine learning model), a test set (e.g., a set of data used to evaluate a final fit of the machine learning model), and/or the like. Wear detection device 190 may preprocess and/or perform dimensionality reduction to reduce the training data to a minimum feature set. Wear detection device 190 may train the machine learning model on this minimum feature set, thereby reducing processing to train the machine learning model, and may apply a classification technique, to the minimum feature set.

Wear detection device 190 may use a classification technique, such as a logistic regression classification technique, a random forest classification technique, a gradient boosting machine learning (GBM) technique, and/or the like, to determine a categorical outcome (e.g., an amount of wear of the one or more components). In addition to, or as an alternative to use the classification technique, wear detection device 190 may use a naïve Bayesian classifier technique. In this case, wear detection device 190 may perform binary recursive partitioning to split the training data of the minimum feature set into partitions and/or branches and use the partitions and/or branches to perform predictions (e.g., a wear rate and/or an amount of wear of the one or more components). Based on using recursive partitioning, wear detection device 190 may reduce utilization of computing resources relative to manual, linear sorting and analysis of data items, thereby enabling use of thousands, millions, or billions of data items to train a model, which may result in a more accurate model than using fewer data items.

Wear detection device 190 may train the machine learning model using a supervised training procedure that includes receiving input to the machine learning model from a subject matter expert (e.g., one or more operators associated with machine 105 and/or the one or more machines), which may reduce an amount of time, an amount of processing resources, and/or the like to train the machine learning model relative to an unsupervised training procedure. Wear detection device 190 may use one or more other model training techniques, such as a neural network technique, a latent semantic indexing technique, and/or the like.

For example, wear detection device 190 may perform an artificial neural network processing technique (e.g., using a two-layer feedforward neural network architecture, a three-layer feedforward neural network architecture, and/or the like) to perform pattern recognition with regard to patterns of different amounts of wear of the one or more components. In this case, using the artificial neural network processing technique may improve an accuracy of the machine learning model generated by wear detection device 190 by being more robust to noisy, imprecise, or incomplete data, and by enabling wear detection device 190 to detect patterns and/or trends undetectable to human analysts or systems using less complex techniques.

After training, the machine learning model may be used to determine (or predict) predicted component wear information. In other words, wear detection device 190 may receive sensor data and/or operator controls data from machine 105 after training the machine learning model and input, into the machine learning model, the received sensor data and the received operator controls data and the machine learning model may output data relating to the wear rate and/or an amount of wear of the one or more components. The output of the machine learning model may include a score for the predicted component wear information. The score, for the predicted component wear information, may represent a measure of confidence of the predicted component wear information.

A different device, such as a server device, may generate and train the machine learning model. The different device may provide the machine learning model for use by wear detection device 190. The different device may update and provide (e.g., on a scheduled basis, on an on-demand basis, on a triggered basis, on a periodic basis, and/or the like) the machine learning model to wear detection device 190. In some instances, wear detection device 190 may receive additional training data (e.g., additional historical sensor data, additional historical operator controls data, and/or additional historical wear data) and retrain the machine learning model. Alternatively, wear detection device 190 may provide the additional training data to the different device to train the machine learning model. The machine learning model may be retrained on a periodic basis and/or based on a triggering event.

In some implementations, wear detection device 190 may provide the machine learning model to controller 140 to enable controller 140 to determine the predicted component wear information. Alternatively, wear detection device 190 may receive a request, from controller 140, to determine the predicted component wear information. The request may include sensor data of machine 105.

Wear detection device 190 (and/or controller 140) may perform an action based on the predicted component wear information. For example, the action may include wear detection device 190 causing an adjustment of an operation of machine 105 based on the predicted amount of wear of the one or more components (e.g., when the predicted amount of wear satisfies a threshold amount of wear). For instance, wear detection device 190 may cause a change of a speed of machine 105, a change of acceleration of machine 105, a change of travel direction of machine 105, a change of implement command, a change of steering command, a change of gear setting, and/or another operation that may reduce a wear rate of the one or more components and prolong the time until the one or more components have to be repaired or replaced.

Wear detection device 190 may cause machine 105 to navigate to a different work site and to perform one or more tasks at the different work site, in an effort to extend the life of the one or more components. For example, the different work site may be associated with a wear rate (of the one or more components) that is less than a wear rate (of the one or more components) associated with a work site where machine 105 is currently located. Additionally, or alternatively, wear detection device 190 may cause machine 105 to perform a different task in an effort to extend the life of the one or more components. For example, the different task may be associated with a wear rate (of the one or more components) that is less than a wear rate (of the one or more components) associated with a task that machine 105 is currently performing.

The action may include wear detection device 190 transmitting wear information to one or more devices that monitor an amount of wear of components of a plurality of machines (e.g., including machine 105). In some examples, wear detection device 190 may transmit the wear information when the amount of wear (of the one or more components) satisfies a threshold amount of wear. The wear information may indicate the amount of wear of the one or more components, indicate a wear rate of the one or more components, indicate an amount wear of the one or more components, and/or an offer associated with repairing and/or replacing the one or more components. The one or more devices may include a device of the site management system, a device of the back office system, a device associated with the operator of machine 105, a device associated with a technician, and/or controller 140.

Wear detection device 190 may transmit the wear information to cause the one or more devices to order one or more replacement components. In some instances, the wear information may include information identifying the one or more components and/or the one or more replacement components.

Wear detection device 190 may transmit the wear information to cause the one or more devices (e.g., controller 140) to cause machine 105 to autonomously navigate to a repair facility. Additionally, or alternatively, wear detection device 190 may transmit the wear information to cause the one or more devices to cause a calendar, of the technician, to be populated with a calendar event to inspect and/or repair the one or more components. Additionally, or alternatively, wear detection device 190 may transmit the wear information to cause the one or more devices (e.g., controller 140) to cause an alarm to be activated. The alarm may indicate that the one or more components are to be repaired or replaced.

In some instances, wear detection device 190 may transmit the wear information to cause the one or more devices to generate a service request to repair and/or replace the one or more components. As part of generating the service request, the one or more devices may perform one or more of the actions described herein.

In some examples, the action may include wear detection device 190 causing a first autonomous device to deliver the one or more replacement components to a location associated with machine 105. The location may include a current location of machine 105, a location of a work site where machine 105 performs multiple tasks, a location where machine 105 is stationed when machine 105 is not performing a task, and/or a location where machine 105 is stationed when machine 105 is undergoing repair and/or replacement. In some instances, the wear information may include information identifying the location associated with machine 105.

In some examples, the action may include wear detection device 190 causing a second autonomous device to navigate to the location associated with machine 105 to verify the predicted component wear information. The second autonomous device may generate verification information, based on verifying the component wear information, and may transmit the verification information to wear detection device 190. Wear detection device 190 may use the verification information to retrain the machine learning model.

In some instances, wear detection device 190 may determine whether a failure of the one or more components is imminent (e.g., based on the predicted component wear information). If wear detection device 190 determines that the failure is imminent, wear detection device 190 may perform one or more of the actions described above. If wear detection device 190 determines that the failure is not imminent, wear detection device 190 may not perform an action.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of system 200 may perform one or more functions described as being performed by another set of devices of system 200.

Figure 3:
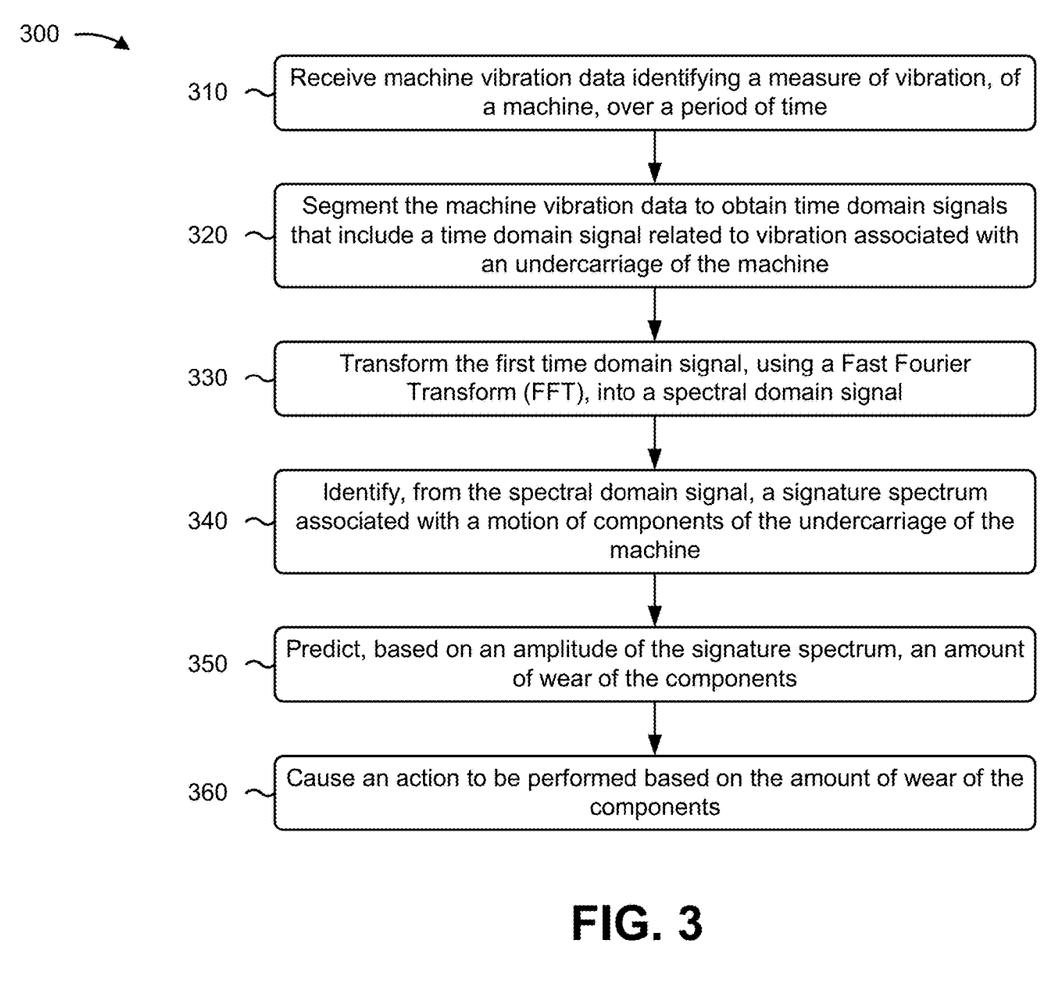
FIG. 3 is a flowchart of an example processes associated with undercarriage wear prediction using machine learning model.

FIG. 3 is a flowchart of an example process 300 associated with undercarriage wear prediction based on machine vibration data. One or more process blocks of FIG. 3 may be performed by a device (e.g., wear detection device 190). One or more process blocks of FIG. 3 may be performed by another device or a group of devices separate from or including the device, such as a controller (e.g., controller 140).

As shown in FIG. 3, process 300 may include receiving machine vibration data identifying a measure of vibration, of a machine, over a period of time (block 310). For example, the device may receive machine vibration data identifying a measure of vibration, of a machine, over a period of time, as described above.

As an example, receiving the machine vibration data may include receiving the machine vibration data from one or more first sensor devices of the machine. Receiving the implement data may comprise at least one of receiving, from one or more second sensor devices of the machine, sensor data indicating whether the one or more implements are engaging the ground surface, or receiving, from one or more operator controls of the machine, operator controls data indicating whether the one or more implements are engaging the ground surface.

As further shown in FIG. 3, process 300 may include segmenting the machine vibration data to obtain time domain signals that include a time domain signal related to vibration associated with an undercarriage of the machine (block 320). For example, the device may segment the machine vibration data to obtain time domain signals that include a time domain signal related to vibration associated with an undercarriage of the machine, as described above.

As an example, the vibration, of the machine, may be caused by the motion of the components and caused by one or more implements of the machine engaging a ground surface, wherein the method further comprises receiving implement data indicating whether the one or more implements are engaging the ground surface during the period of time. Segmenting the machine vibration data comprises segmenting the machine vibration data, based on the implement data, to identify the time domain signals.

The time domain signal may be a first time domain signal. The time domain signals may include a second time domain signal related to vibration that is unrelated to the vibration associated with the undercarriage of the machine.

As further shown in FIG. 3, process 300 may include transforming the time domain signal, using a Fast Fourier Transform (FFT), into a spectral domain signal (block 330). For example, the device may transform the time domain signal, using a Fast Fourier Transform (FFT), into a spectral domain signal, as described above.

Transforming the time domain signal into the spectral domain signal may cause a first portion of the time domain signal, corresponding to the motion of the components, to be amplified based on a power spectral density of the time domain signal, and a second portion of the time domain signal, corresponding to random noise associated with terrain conditions at a location of the machine, to be reduced based on the power spectral density of the time domain signal. The power spectral density may be determined using the FFT. The signature spectrum may be identified in a portion of the power spectral density corresponding to the first portion of the time domain signal.

As further shown in FIG. 3, process 300 may include identifying, from the spectral domain signal, a signature spectrum associated with a motion of components of the undercarriage of the machine (block 340). For example, the device may identify, from the spectral domain signal, a signature spectrum associated with a motion of components of the undercarriage of the machine, as described above.

As further shown in FIG. 3, process 300 may include predicting, based on an amplitude of the signature spectrum, an amount of wear of the components (block 350). For example, the device may predict, based on an amplitude of the signature spectrum, an amount of wear of the components, as described above.

Predicting an amount of wear of the components may comprise predicting the amount of wear of the components based on the amplitude of the signature spectrum, and historical wear data associated with the components.

As further shown in FIG. 3, process 300 may include causing an action to be performed based on the amount of wear of the components (block 360). For example, the device may cause an action to be performed based on the amount of wear of the components, as described above.

Performing the action may comprise at least one of causing the components to be serviced, causing the components to be replaced, causing an adjustment to an operation of the machine, or providing an alert to a device of an operator of the machine.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

This disclosure relates to a device that predicts an amount of wear of one or more components of an undercarriage of a machine based on sensor data, from a sensor device, associated with machine vibration of the machine. The disclosed device for predicting the amount wear of the one or more components may prevent issues associated with manual measurements of tracks of the machine (to determine an amount of wear of the tracks) and incorrect predictions of an amount of wear of the tracks.

Manual measurements of tracks may waste machine resources that are used to prevent movement of the machine while the manual measurements are obtained. Additionally, incorrect manual measurements of tracks and/or incorrect predictions of the amount of wear of the tracks may waste computing resources that are used to remedy issues associated with the incorrect manual measurements and/or incorrect predictions of the amount of wear of the tracks (e.g., premature failure of the tracks, premature repair of the tracks, and/or premature replacement of the tracks).

The disclosed device for predicting the amount of wear of the one or more components of the undercarriage may resolve the issues mentioned above with respect to the manual measurements and with respect to the incorrect predictions of the amount of wear. Several advantages may be associated with the disclosed device. For example, by predicting the amount of wear of the one or more components based on machine vibration data, the device may limit any disruption in the operation of the machine and/or limit immobilizing the machine, thereby enabling the machine to remain operational for an extended period of time (e.g., until a repair or a replacement of the tracks is required). By predicting the amount of wear of the one or more components based on machine vibration data, the device may enable the tracks to be repaired or replaced when a repair or a replacement of the tracks is required (as opposed to the tracks being repaired or replaced prematurely).

By predicting the amount of wear of the one or more components based on machine vibration data, the device may reduce the incorrect predictions of the amount of wear. By reducing incorrect predictions of the amount of wear of the tracks, the device may reduce a possibility of failure of the tracks prior to the tracks being repaired and/or replaced. By reducing incorrect predictions of the amount of wear of the tracks, the device may preserve computing or machine resources that would have otherwise been used to remedy issues associated with the manual measurements being inaccurate and with the incorrect predictions of the amount of wear of the tracks (e.g., premature failure of the tracks, premature repair of the tracks, and/or premature replacement of the tracks).

The foregoing disclosure provides illustration and description, but is not intended to be exhaustive or to limit the implementations to the precise form disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method performed by a device, the method comprising:
   receiving machine vibration data identifying a measure of vibration, of a machine, over a period of time;
   segmenting the machine vibration data to obtain time domain signals that include a time domain signal related to vibration associated with an undercarriage of the machine;
   transforming the time domain signal, using a Fast Fourier Transform (FFT), into a spectral domain signal;
   identifying, from the spectral domain signal, a signature spectrum associated with a motion of components of the undercarriage of the machine;
   predicting, based on an amplitude of the signature spectrum, an amount of wear of the components; and
   causing an action to be performed based on the amount of wear of the components.

2. The method of claim 1, wherein the vibration, of the machine, is caused by the motion of the components and caused by one or more implements of the machine engaging a ground surface;
   wherein the method further comprises:
      receiving implement data indicating whether the one or more implements are engaging the ground surface during the period of time; and
   wherein segmenting the machine vibration data comprises:
      segmenting the machine vibration data, based on the implement data, to identify the time domain signals.

3. The method of claim 2, wherein receiving the machine vibration data includes receiving the machine vibration data from one or more first sensor devices of the machine; and
   wherein receiving the implement data comprises at least one of:
      receiving, from one or more second sensor devices of the machine, sensor data indicating whether the one or more implements are engaging the ground surface; or
      receiving, from one or more operator controls of the machine, operator controls data indicating whether the one or more implements are engaging the ground surface.

4. The method of claim 1, wherein the time domain signal is a first time domain signal; and
   wherein the time domain signals include a second time domain signal related to vibration that is unrelated to the vibration associated with the undercarriage of the machine.

5. The method of claim 1, wherein transforming the time domain signal into the spectral domain signal comprises causing:
   a first portion of the time domain signal, corresponding to the motion of the components, to be amplified based on a power spectral density of the time domain signal, and
   a second portion of the time domain signal, corresponding to random noise associated with terrain conditions at a location of the machine, to be reduced based on the power spectral density of the time domain signal,
wherein the power spectral density is determined using the FFT; and
wherein the signature spectrum is identified in a portion of the power spectral density corresponding to the first portion of the time domain signal.

6. The method of claim 1, wherein predicting an amount of wear of the components comprises:
predicting the amount of wear of the components based on:
the amplitude of the signature spectrum, and
historical wear data associated with the components.

7. The method of claim 1, wherein performing the action comprises at least one of:
causing the components to be serviced;
causing the components to be replaced;
causing an adjustment to an operation of the machine; or
providing an alert to a device of an operator of the machine.

8. A system, comprising:
a device configured to:
receive machine vibration data identifying a measure of vibration of a machine,
wherein the vibration, of the machine, is caused by a combination of first vibration caused by a motion of components of an undercarriage of the machine and second vibration that is unrelated to the first vibration;
identify a segment, of the machine vibration data, corresponding to the first vibration;
transform the segment, using a Fast Fourier Transform (FFT), into a signal in a frequency domain;
analyze the signal to identify a signature spectrum associated with the motion of components;
predict, based on the signature spectrum, an amount of wear of the components; and
cause an action to be performed based on the amount of wear of the components.

9. The system of claim 8, wherein, when predicting the amount of wear of the components, the device is configured to:
predict the amount of wear of the components based on an amplitude of the signature spectrum.

10. The system of claim 8, wherein, when predicting the amount of wear of the components, the device is configured to:
predict the amount of wear of the components based on:
the signature spectrum, and
historical wear data associated with the components.

11. The system of claim 8, wherein, when performing the action, the device is configured to:
cause the components to be serviced;
cause the components to be replaced;
cause an adjustment to an operation of the machine;
provide information regarding the amount of wear to a device that monitors wear of components of machines; or
provide an alert to a device of an operator of the machine.

12. The system of claim 8, wherein, when identifying the segment, the device is configured to:
receive implement data indicating whether an implement, of the machine, is engaging a ground surface; and
identify the segment based on the implement data.

13. The system of claim 12, wherein the implement data includes at least one of:
machine speed data identifying a speed of the machine;
implement command data identifying a command for controlling the implement;
steering command data identifying a steering command of the machine; or
gear setting data identifying a gear setting of the machine.

14. The system of claim 8, wherein, when transforming the segment, the device is configured to:
cause a portion of the segment, corresponding to the motion of the components, to be maximized based on a power spectral density of the segment,
wherein the power spectral density of the segment is determined using the FFT; and
wherein the signature spectrum is identified in a portion of the power spectral density corresponding to the portion of the segment.

15. A device, comprising:
one or more memories; and
one or more processors configured to:
receive machine vibration data identifying a measure of vibration of a machine,
wherein the vibration, of the machine, is caused by a combination of first vibration caused by a motion of components of an undercarriage of the machine and second vibration that is unrelated to the first vibration;
identify a segment, of the machine vibration data, corresponding to the first vibration;
transform the segment, using a Fast Fourier Transform (FFT), into a signal in a frequency domain;
analyze the signal to identify a signature spectrum associated with the motion of components;
predict, based on the signature spectrum, an amount of wear of the components; and
cause an action to be performed based on the amount of wear of the components.

16. The device of claim 15, wherein the components include at least one of a sprocket, an idler, or a track link; and
wherein, when receiving the machine vibration data, the one or more processors are configured to receive the machine vibration data from one or more first sensor devices of the machine.

17. The device of claim 16, wherein the one or more processors are configured to at least one of:
receive, from one or more second sensor devices of the machine, sensor data indicating whether an implement, of the machine, is engaging a ground surface; or
receive, from one or more operator controls of the machine, operator controls data indicating whether the implement is engaging the ground surface; and
wherein, when identifying the segment, the one or more processors are configured to:
identify the segment based on at least one of the sensor data or the operator controls data.

18. The device of claim 17, wherein the second vibration corresponds to vibration caused by the implement, of the machine, engaging the ground surface.

19. The device of claim 15, wherein, when performing the action, the one or more processors are configured to:
cause the components to be serviced;
cause the components to be replaced;
cause an adjustment to an operation of the machine;
provide information regarding the amount of wear to a device that monitors wear of components of machines; or
provide an alert to a device of an operator of the machine.

20. The device of claim 15, wherein, when predicting the amount of wear of the components, the one or more processors are configured to:
  predict the amount of wear of the components based on:
    the signature spectrum, and
    historical wear data associated with the components.

\* \* \* \* \*